Dec. 29, 1970    A. K. CHITAYAT    3,551,055
INTERFEROMETER FOR MAKING ANGULAR AND LINEAR MEASUREMENTS
Filed Feb. 12, 1968                    2 Sheets-Sheet 1

*INVENTOR.*
ANWAR K. CHITAYAT

*INVENTOR.*
ANWAR K. CHITAYAT 3,551,055
INTERFEROMETER FOR MAKING ANGULAR AND
LINEAR MEASUREMENTS
Anwar K. Chitayat, Plainview, N.Y., assignor to
OPTOmechanisms, Inc., Plainview, N.Y.
Filed Feb. 12, 1968, Ser. No. 704,756
Int. Cl. G01b 9/02
U.S. Cl. 356—108                                   1 Claim

ABSTRACT OF THE DISCLOSURE

An interferometer for measuring the distance to, yaw angle and/or the pitch angle of movable member with three different modes of operation. First and second corner cube reflectors are spaced on the movable member in a horizontal plane and spaced from the axis of rotation of the member and a third corner cube reflector is mounted above one of first and second reflectors and in the same vertical plane.

In the yaw mode of operation, the energy is split into two beams which are reflected from the first and second corner cubes. In the linear measurement mode, a corner cube reflector having "in" and "out" positions, is put in the "in" position to cut off one of the beams and to provide a fixed reference for linear measurements by the other beam. In the pitch angular measurement mode of operation a prism having "in" and "out" positions is placed in an "in" position to divert one of the beams to the third vertically displaced corner cube and receive a reflection back from it in order to provide a measurement of pitch angle.

---

This invention relates to interferometer means having combined angular and linear measuring means.

More particularly, the invention relates to an interferometer having means to operate in three modes. One mode measures the yaw angle of a movable member, a second mode measures the linear distance to the movable member, and a third mode measures pitch angle of the movable member.

Simple linear measuring by interferometers is old. Prior angular interferometers are generally separate instruments, so that in order to measure the distance of a movable member and also measure the angle of the movable member, it is necessary to substitute a new interferometer mechanism. This is a very tedious and time consuming operation since it is necessary to align the interferometer very accurately.

The present invention combines in a single apparatus means for measuring the linear distance, the yaw angle and the pitch angle of the movable member with the same instrument and without any additional set up and aligning of different interferometer instruments.

Accordingly, a principal object of the invention is to provide new and improved interferometer means for measuring linear distance to, and angular movement of a movable member.

Another object of the invention is to provide new and improved interferometer means having three modes of operation, a first mode to measure the linear distance, a second mode to measure the yaw angle, and a third mode to measure pitch angle of a movable member.

Another object of the invention is to provide new and improved interferometer means for measuring linear and angular movement of a movable member comprising, first and second retroreflector prism members mounted on said rotatable member on opposite sides of the center of rotation of said rotatable member, a fixed beam source, fixed means to split said beam from said source into first and second beams, said fixed means being adapted to transmit said first beam to one of said retroreflector members, fixed means to transmit said second beam to the other of said retroreflector members, means to then receive said beam reflection from said first and second reflector prisms members, means to combine said reflections to provide an interference fringe pattern movement proportional to the difference in length between said paths resulting from rotation of said rotatable member, and movable mirror means having "in" and "out" positions said "in" position being positioned to receive said second beam from said beam splitter and transmit said second beam back to said beam splitter, whereby when said movable mirror is in "in" position said first beam is adapted to measure linear movement of said movable member.

These and other objects of the invention will be apparent from the following specification and drawings of which FIG. 1 is a diagram illustrating the measurement of yaw angle.

Figure 1:
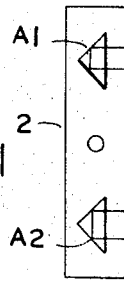
Figure 1:
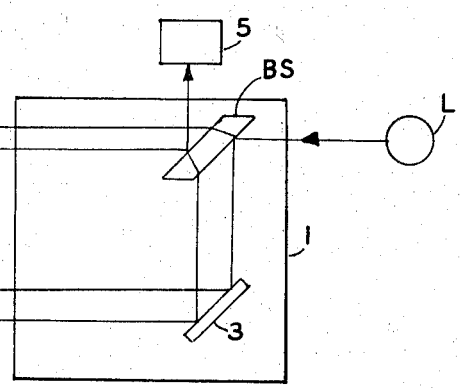

FIG. 1 illustrates the use of the invention in measuring the yaw angle. A beam of energy, for instance a laser beam, is provided by the beam source L. This beam is split by the beam splitter BS. A first beam is transmitted to the corner cube A1 on the movable member 2. A second beam is transmitted to the mirror 3 fixedly mounted on the interferometer base 1 and then transmitted to the corner cube A2 on the movable member 2. The corner cubes A1 and A2 are approximately equally spaced from the center of rotation 4 of the movable member. The first and second beams are reflected back through the same path to the beam splitter BS where they form fringes proportional to the angular yaw movement of the member 2. The fringes may be read by a photo detector assembly 5 in conventional manner such as shown in applicant's Pat. No. 2,271,676. The conventional optical elements for detection of phase to determine reversal of motion are not shown.

Figure 2:
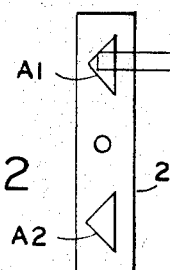
FIG. 2 is a diagram illustrating use in measuring linear distance.
Figure 2:
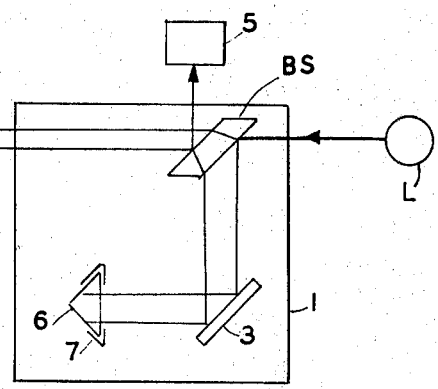

FIG. 2 illustrates a second mode of operation for measuring linear distance. This operation is the same as described in connection with FIG. 1 except that the second beam is cut off and returned by the corner tube 6 which has a fixed space relation to fixed mirror 3. The corner cube 6 is movably mounted on the base 1 for instance in a slide 7 so that it can move up and down and have "in" or "out" positions. The "in" position is shown in FIG. 2 and the "out" position is shown in FIG. 1.

Figure 3:
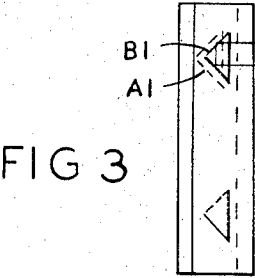
FIGS. 3 and 3A are diagrams illustrating use in measuring pitch angle.
Figure 3:
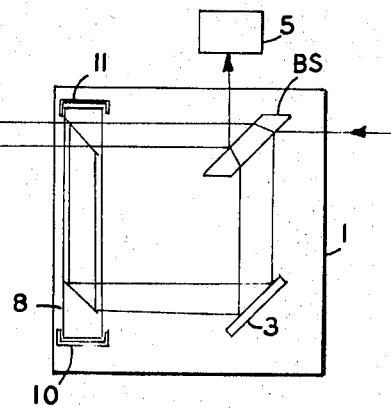
Figure 3A:
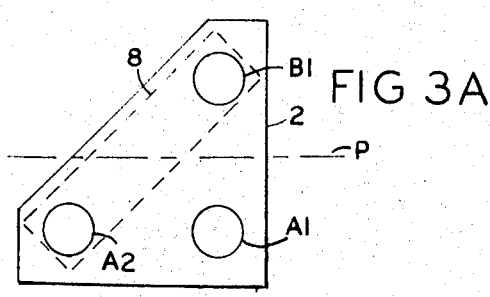

FIGS. 3 and 3A show a third mode of operation for measuring the pitch angle. In this mode of operation a third corner cube reflector B1 is mounted above the reflector A1 and in the same vertical plane. This mode of operation is similar to that previously described. The first beam goes to A1 and returned as previously described. However, the second beam is diverted to corner cube B1 by means of the prism 8 which is vertically moved in slides 10 and 11 so that it has "in" and "out" position, the "in" position being shown in FIG. 3.

In this mode of operation the second beam does not go to corner cube A1 but is diverted by the prism 8 vertically so that it goes to the corner cube B1 and returns. Therefore, the fringe pattern will be a measure of the pitch angle about the axis P illustrated in FIG. 3A. The orientation of the prism 8 is illustrated by the dotted lines in FIG. 3A; however it is understood that the prism 8 is mounted on the base 1 in the slides 10 and 11.

Figure 4:
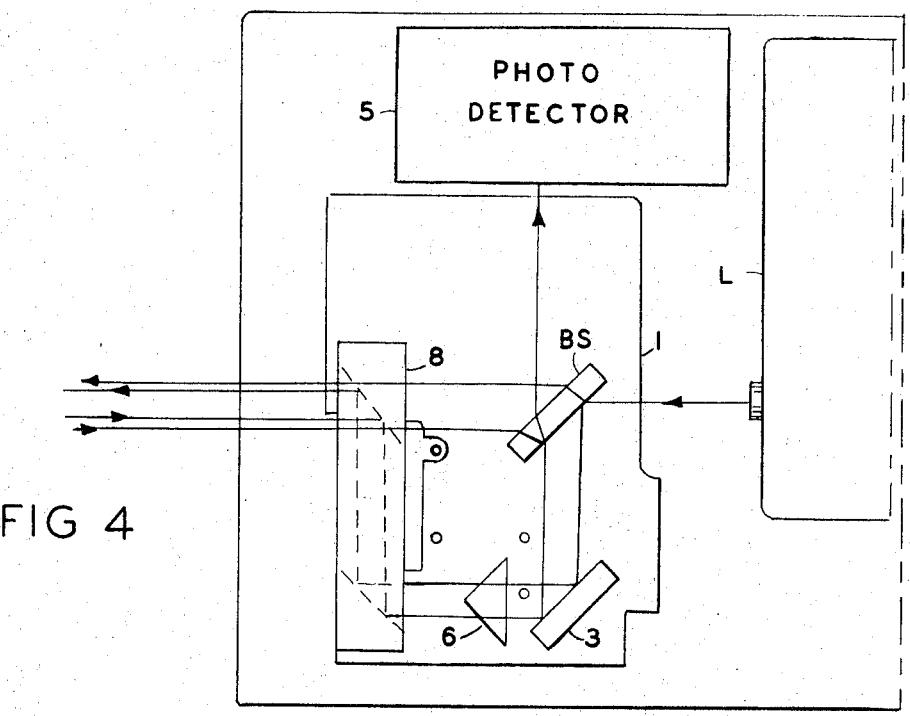
FIG. 4 is a top view of an embodiment of the invention.
Figures 5, 6:
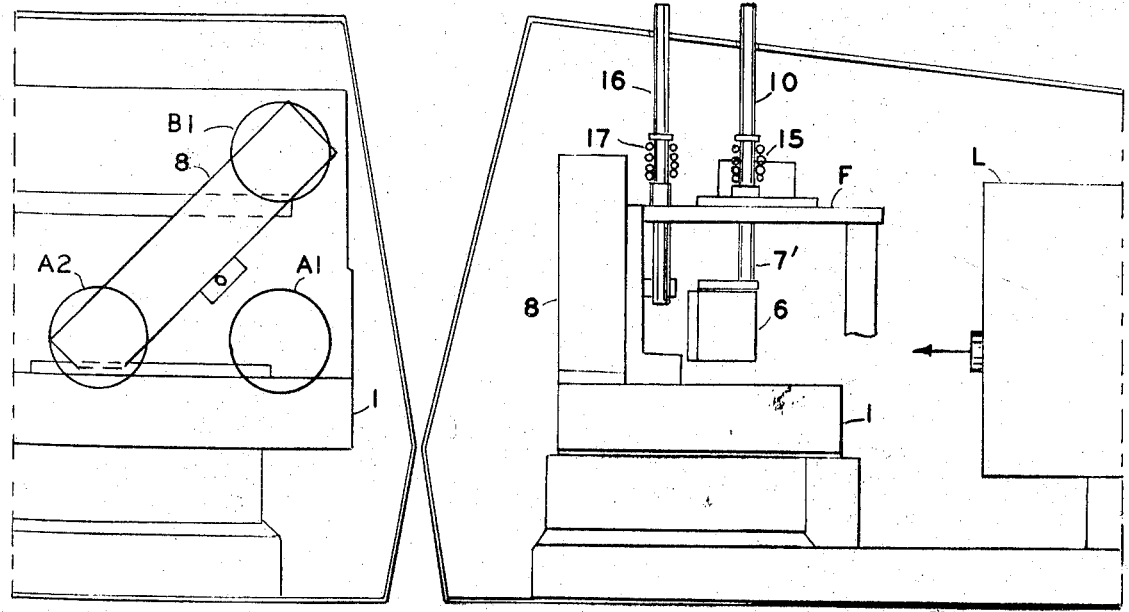
FIG. 5 is a side view of the embodiment of the invention.
FIG. 6 is a front sectional view of an embodiment of FIG. 5.

FIGS. 4, 5, and 6 illustrate an embodiment of the invention. FIG. 4 is a horizontal view showing laser generator L which transmits a beam to the fixed beam splitter BS which is fixedly mounted on the base 1. In the yaw mode of FIG. 1 both prism 8 and corner cube 6 are lifted to "out" position. The first beam is transmitted to the corner reflector A1 which is mounted on a movable member. A second beam is transmitted to the mirror 3, fixedly mounted on the base 1, and then to the corner cube A2 to provide the yaw angle mode of operation as illustrated in FIG. 1.

To provide the linear measurement mode of operation illustrated in FIG. 2, the corner cube 6 is moved down. It is slidably mounted on a slide member 7' which is mounted on the frame F of the apparatus. The slide 7' is adapted to be manually moved up and down by handle 10 to move the corner cube into "in" and "out" positions. A spring 15 may be provided to normally hold the corner cube 6 in "out" position.

To provide the pitch angle mode of operation illustrated in FIG. 3, the prism 8 is movably mounted in the frame F by means of the handle 16, is moved down to "in" position. It may be spring loaded in the "out" position by means of spring 17. FIG. 3A is a sectional detail view illustrating the space relation of the prism 8 to the reflectors A1, A2, and B1.

Many modifications may be made by those who desire to practice the invention without departing from the scope thereof which is defined by the following claim:

1. Interferometer means for measuring linear and angular movement of a movable member comprising:
first and second retroreflector prism members mounted on said rotatable member on opposite sides of the center of rotation of said rotatable member,
a fixed beam source,
fixed means to split said beam from said source into first and second beams,
said fixed means being adapted to transmit said first beam to one of said retroreflector members,
fixed means to transmit said second beam to the other of said retroreflector members,
means to then receive said beam reflections from said first and second reflector prism members,
means to combine said reflections to provide an interference fringe pattern movement proportional to the difference in length between said paths resulting from rotation of said rotatable member,
and movable mirror means having "in" and "out" positions, said "in" position being positioned to receive said second beam from said beam splitter and transmit said second beam back to said beam splitter,
whereby when said movable mirror is in "in" position said first beam is adapted to measure linear movement of said movable member,
said movable member having a third retroreflector vertically spaced from said first and second retroreflectors,
and a movable prism having "in" and "out" positions, said "in" positions being in the path of one of said beams and adatped to reflect said one beam back from said third retroreflector and to transmit it back to said beam splitter whereby when said movable prism is in "in" position a measurement of pitch angle of said movable member is made.

References Cited

UNITED STATES PATENTS

| | | | |
|---|---|---|---|
| 2,880,644 | 4/1959 | Brockway et al | 356—110 |
| 3,085,466 | 4/1963 | Hemstreet | 356—110 |
| 3,186,294 | 6/1965 | Woodson | 356—110 |
| 3,218,915 | 11/1965 | Ramsay | 356—110 |
| 3,436,153 | 4/1969 | Baldwin | 356—106 |

FOREIGN PATENTS

| | | | |
|---|---|---|---|
| 768,890 | 10/1967 | Canada | 356—106 |

RONALD L. WIBERT, Primary Examiner

C. CLARK, Assistant Examiner